United States Patent [19]
Khalid

[11] Patent Number: 5,473,672
[45] Date of Patent: Dec. 5, 1995

[54] INBAND MESSAGING SYSTEM INTERFACE OF A PBX

[75] Inventor: Zafar M. Khalid, San Jose, Calif.

[73] Assignee: Rolm Company, Santa Clara, Calif.

[21] Appl. No.: 215,838

[22] Filed: Mar. 21, 1994

[51] Int. Cl.⁶ .............................. H04M 1/64; H04M 7/00
[52] U.S. Cl. .................. 379/67; 379/88; 379/211; 379/232; 379/234
[58] Field of Search ................................. 379/210, 211, 379/212, 231, 233, 67, 89, 88, 196, 198, 232, 234

[56] References Cited

U.S. PATENT DOCUMENTS

| | | | |
|---|---|---|---|
| 4,879,743 | 11/1989 | Burke et al. | 379/210 |
| 4,930,153 | 3/1995 | Hagedorn | 379/233 |
| 5,218,631 | 6/1993 | Katz | 379/196 |

Primary Examiner—Jeffery A. Hofsass
Assistant Examiner—Daniel S. Hunter

[57] ABSTRACT

A method for responding to a call to a called associated with a private branch exchange ("PBX") which is connected to a central office ("CO") by direct inward dial ("DID") trunks, which PBX is connected to a messaging system, the method includes the steps of: (a) responding to the call from the calling party and receiving the called address information; (b) determining whether to forward the call to the messaging system; (c) forwarding the call to the messaging system and transmitting the address information to the messaging system over a line; (d) detecting whether loop current is present or absent from the line after a predetermined interval; (e) if loop current is present, transmitting an answer signal to the CO, and (f) if loop current is absent, transmitting an identifying tone to the CO.

7 Claims, 1 Drawing Sheet

5,473,672

INBAND MESSAGING SYSTEM INTERFACE OF A PBX

TECHNICAL FIELD OF THE INVENTION

The present invention pertains to an improved inband messaging system interface a private branch exchange ("PBX").

BACKGROUND OF THE INVENTION

The following describes a prior art, inband, messaging system (for example, voice mail system) interface a private branch exchange ("PBX") having a DID (Direct Inward Dialing) feature, which PBX is connected to a central office ("CO") over DID lines. The normal sequence of actions for call setup in this system occurs as follows. Step 1: after an incoming seizure, the PBX receives address information from the CO. The address information takes the form of dial pulse or DTMF digits (the dial pulse or DTMF digits are transmitted from the CO to the PBX in accordance with the EIA RS-464 standard) and the address information identifies a called station, i.e., local extension at the PBX. Step 2: After the PBX receives the address information, and before the PBX sends an answer signal to the CO, the PBX returns a Call Progress tone signal to the calling party. The Call Progress tone signal depends upon the status of the called station at the PBX and typically is one of the following: Busy Tone, Reorder Tone, or Ringback Tone. Step 3: Whenever a call is answered by the called station, the PBX sends an answer signal to the CO by applying an appropriate voltage to the tip conductor of the DID circuit. At this time, a voice path is established between the calling and called parties and the CO starts billing the calling party for the call. Step 4: If the called station does not answer (this may be due a number of reasons such as, for example, immediate forwarding, busy, no answer, and so forth), the PBX, if programmed to do so, forwards the call to a messaging system such as a voice mail system ("VMS") over specific lines. Whenever the VMS answers the forwarded call, the PBX transmits the address information (for example, in the form of DTMF digits) identifying the original called station inband over one of the specific lines connecting the PBX and the VMS. At the same time, the PBX sends an answer signal to the CO by applying an appropriate voltage to the tip conductor of the DID circuit to notify the CO of the call answer. As a result, the CO considers the call to be established and the CO starts to bill the calling party.

As one can appreciate from the above, whenever a call gets forwarded to the VMS, the PBX outpulses address information (for example, DTMF digits) identifying the original called station as soon as the VMS answers the call. However, in some situations, it is desirable that the VMS not answer the call if it is intended for certain predetermined called (for example, resources are not available to service the call and in particular, a facsimile resource is not available). In such a situation, the VMS is programmed to drop the call once it recognizes that the address information refers to one of the predetermined called. A problem occurs in that the VMS needs to answer the call to collect the address information. Then, in response to that answer, the PBX notifies the CO, which notification results in billing. This billing occurs even if the VMS drops the call immediately upon recognizing that it should not have answered the call in the first place. As a consequence, a calling party will be billed for a call which he/she believes was never answered. The solution for this problem in the prior art, is to have the VMS inform the calling party that the call cannot be handled at that time and then to have the VMS hang up. However, this still results in billing.

In light of the above, there is a need in the an for a method of interfacing a PBX to a messaging system such as a VMS wherein the PBX will send an answer signal to a CO only if the VMS will call.

SUMMARY OF THE INVENTION

Advantageously, embodiments of the present invention advantageously solve the above problem in the prior art by avoiding billing a calling party for calls which a messaging system such as a voice mail system ("VMS") will not answer. In particular, a private branch exchange ("PBX") will provide answer signal to a central office only when the VMS will call.

Specifically, an embodiment of the present invention is a method for responding to a call to a called associated with a private branch exchange ("PBX") which is connected to a central office ("CO") by direct inward dial ("DID") trunks, which PBX is connected to a messaging system, the method includes the steps of: (a) responding to the call from the calling party and receiving the called station address information; (b) determining whether to forward the call to the messaging system; (c) forwarding the call to the messaging system and transmitting the address information to the messaging system over a line; (d) detecting whether loop current is present or absent from the line after a predetermined interval; (e) if loop current is present, transmitting an answer signal to the CO; and (f) if loop current is absent, transmitting an identifying tone to the CO.

DETAILED DESCRIPTION

Figure 1:
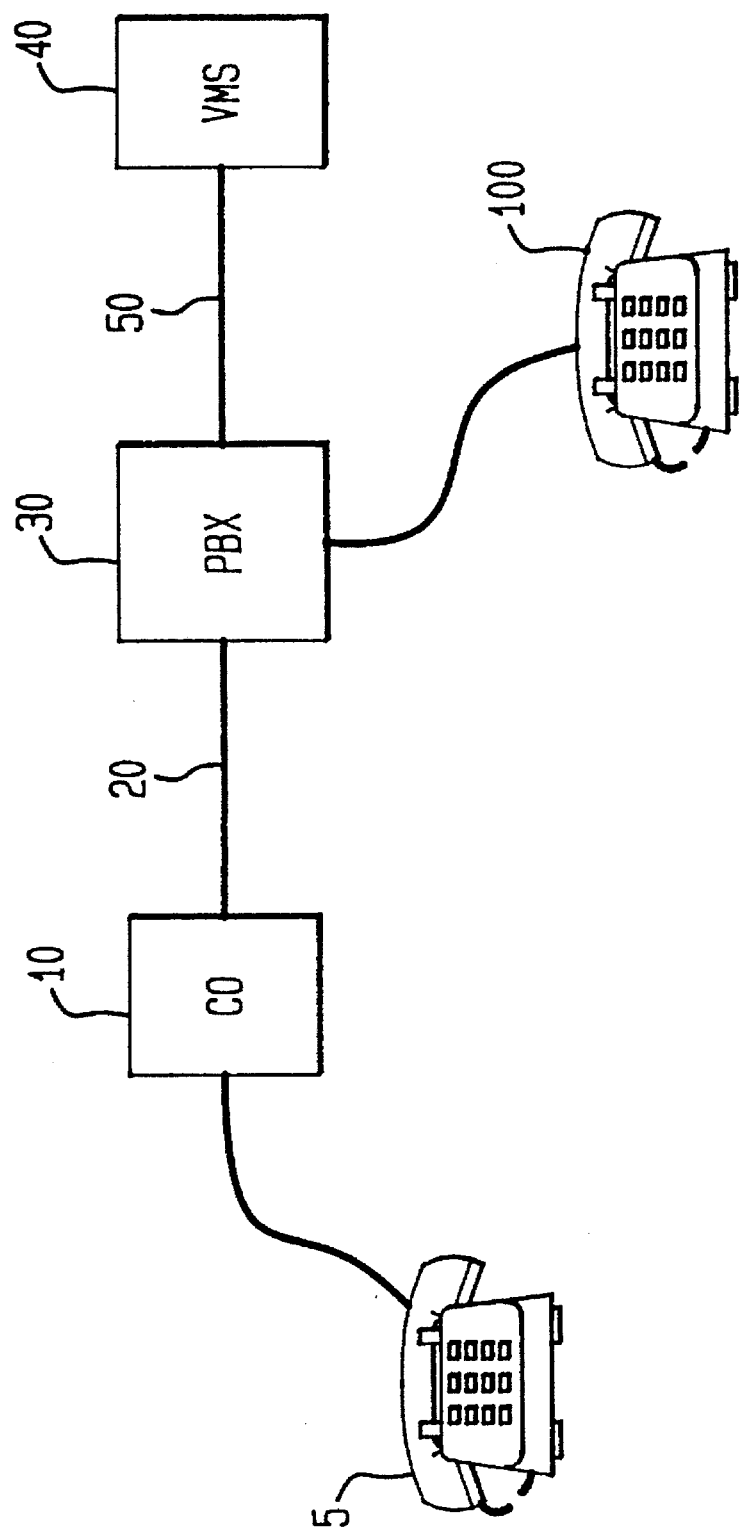
FIG. 1 shows in pictorial form an arrangement wherein a calling party calls a called party which is associated with a private branch exchange ("PBX") wherein a voice mail system ("VMS") is associated with the PBX.

An embodiment of the present invention is a method for interfacing between a private branch exchange ("PBX") and a messaging system such as a voice mail system ("VMS"). FIG. 1 shows in pictorial form an arrangement wherein a calling party calls a called party which is associated with PBX 30 wherein VMS 40 is associated with PBX 30. As shown in FIG. 1, PBX 30 receives a call made at calling station 5 from CO 10 over DID lines 20. As is well known to those of ordinary skill in the art, after the incoming seizure, PBX 30 receives address information over DID lines 20. The address information takes the form of dial pulse or DTMF digits (the dial pulse or DTMF digits are transmitted from CO 10 to PBX 30 in accordance with the EIA RS-464 standard) and the address information identifies called ①  100 ②, a local extension at PBX 30. After PBX 30 receives the address information, and before PBX 30 sends an answer signal to CO 10, PBX 30 returns a Call Progress tone signal to CO 10 for relay to the calling party. The Call Progress tone signal depends upon the status of called 100 at PBX 30 and typically is one of the following: Busy Tone, Reorder Tone, or Ringback Tone.

Then, PBX 30 attempts to establish a connection to called 100, for example, telephone 100. Whenever the call is answered by called 100, PBX 30 sends an answer signal to CO 10 by applying an appropriate voltage to the tip conductor of the DID circuit (the manner in which an answer signal is sent to a central office from a PBX is well known to those or ordinary skill in the art). In response, a voice path is established between the calling and called parties and CO 10 starts billing the calling party for the call.

If a connection cannot be made to the called (for example, due to immediate forward, busy, no answer and so forth), PBX 30, if programmed to do so, forwards the call to VMS 40 over one of interface lines 50 in a manner which is well known to those of ordinary skill in the art. Whenever VMS 40 answers the forwarded call, PBX 30 transmits the address information identifying the called (for example, in a manner which is well known to those of ordinary skill in the art in the form of DTMF digits) to VMS 40 inband over the one of interface lines 50. The transmission of the address information takes place in a first time interval of programmable length, the length being typically of about 1 to 2 seconds in duration.

In accordance with the inventive method, after that, PBX 30 waits for a second time interval of programmable length, the length being short (about 0.5 to 1.0 seconds in duration). This provides time for VMS 40 to process the address information. Next, after the second time interval, PBX 30 monitors loop current on the one of interface lines 50 on which PBX 30 has transmitted the address information in a manner which is well known to those of ordinary skill in the art.

If VMS 40 determines that it should answer the call, VMS 40 will maintain loop current on the line. After the waiting period, PBX 30 will detect this condition, i.e., of loop current. In response, PBX 30 will send an answer signal to CO 10 by applying an appropriate voltage to the tip conductor of the DID circuit as described above to inform CO 10 that the call has been answered.

If VMS 40 determines that it should not answer the call, VMS 40 will open the loop by hanging up on the line over which it received the address information. After the waiting period, PBX 30 will detect this condition, i.e., the drop of loop current. In response, PBX 30 will transmit tones CO 10 in a manner which is well known to those of ordinary skill in the art and CO 10 will relay the tones to the calling party to indicate the call cannot be completed. For example, such tones may be Reorder Tone, Busy Tone and so forth, as allowed by EIA RS-464 standard. The calling party should understand that the tone indicates that the call cannot be answered due to, for example, lack of equipment.

In accordance with a preferred embodiment of the inventive method, sum of the first time interval for transmitting the address information and the second time interval for determining whether loop current is dropped should be kept as short as possible. As an example, in accordance with a preferred embodiment of the present invention, 2.0 to 3.0 seconds is considered to be a reasonable length of time. Further, it is preferable that the length of the first time interval and the second time interval be programmably variable in a manner which is well known to those of ordinary skill in the art at PBX 30. Of course, those of ordinary skill in the art understand that the time intervals should be selected so that the inventive method does not violate the EIA RS-464 standard for answer supervision on DID lines.

As one can readily appreciate from the above, in accordance with the present invention, external calls arriving over DID lines at a PBX will only be sent an answer signal whenever VMS 40 is willing to answer the call. Advantageously, this avoids billing a calling party for calls which VMS 40 will not answer.

Those skilled in the art will recognize that the foregoing description has been presented for the sake of illustration and description only. As such, it is not intended to be exhaustive or to limit the invention to the precise form disclosed. For example, modifications and variations are possible in light of the above teaching which are considered to be within the spirit of the present invention. In particular, although the inventive method has been discussed for calls arriving from outside a PBX over DID lines, the inventive method can be utilized for internal calls as well. In the case of internal calls, the PBX would use an appropriate tone such as, for example, internal Reorder Tone, to notify the calling party that the VMS is rejecting the call.

Those of ordinary skill in the art understand that the present invention relates to messaging systems in general and to voice messaging systems in particular. Thus, the present invention relates to other types of messaging systems such as, for example, a facsimile messaging system.

What is claimed is:

1. A method for responding to a call to a called number associated with a private branch exchange ("PBX") which is connected to a central office ("CO"), which PBX is connected to a messaging system, the method comprising the steps of:

responding to the call from the calling party and receiving the called address information;

determining whether to forward the call to the messaging system;

forwarding the call to the messaging system and transmitting the address information to the messaging system over a line;

detecting whether loop current is present or absent from the line after a predetermined and programmable time after the address information has been transmitted to the messaging system;

if loop current is present, transmitting an answer signal to the CO; and if loop current is absent transmitting an identifying tone to the CO, said identifying tone being indicative of a call that was not connected.

2. A method for responding to a call to a called number associated with a private branch exchange ("PBX") which is connected to a central office ("CO"), which PBX is connected to a messaging system, the method comprising the steps of:

responding to the call from the calling party and receiving the called station address information;

determining whether to forward the call to the messaging system;

forwarding the call to the messaging system and transmitting the address information to the messaging system over a line;

detecting whether loop current is present or absent from the line;

if loop current is present, transmitting an answer signal to the CO; and if loop current is absent, transmitting an identifying tone to the CO, wherein the identifying tone is reorder tone.

3. A method for responding to a call to a called number associated with a private branch exchange ("PBX") which PBX is connected to a messaging system, the method comprising the steps of:

responding to the call from calling party and receiving the called number address information;

determining whether to forward the call to the messaging system;

forwarding the call to the messaging system and transmitting the address information to the messaging system over a line;

detecting whether loop current is present or absent from the line after the address information has been transmitted to the messaging system;

if loop current is present, connecting the calling party with the messaging system; and if loop current is absent, transmitting an identifying tone to the calling party, said identifying tone being indicative of a call that could not be connected to the called number.

4. The method of claim 3 wherein the step of detecting whether loop current is present or absent from the line comprises detecting after a predetermined and programmable time.

5. A method for responding to a call to a called number associated with a private branch exchange ("PBX") which PBX is connected to a messaging system, the method comprising the steps of:

responding to the call from calling party and receiving the called number address information;

determining whether to forward the call to the messaging system;

forwarding the call to the messaging system and transmitting the address information to the messaging system over a line;

detecting whether loop current is present or absent from the line;

if loop current is present, connecting the calling party with the messaging system; and if loop current is absent, transmitting an identifying tone to the calling party, wherein the identifying tone is an Internal Reorder Tone.

6. A method for responding to a call to a called number associated with a private branch exchange ("PBX") which is connected to a central office ("CO"), which PBX is connected to a messaging system, the method comprising the steps of:

responding to the call from the calling party and receiving the called address information;

determining whether to forward the call to the messaging system;

forwarding the call to the messaging system and transmitting the address information to the messaging system over a line;

detecting whether loop current is present or absent from the line;

if loop current is present, transmitting an answer signal to the CO; and if loop current is absent, transmitting an identifying tone to the CO, wherein the identifying tone is busy tone.

7. A method for responding to a call to a called number associated with a private branch exchange ("PBX") which PBX is connected to a messaging system, the method comprising the steps of:

responding to the call from calling party and receiving the called number address information;

determining whether to forward the call to the messaging system;

forwarding the call to the messaging system and transmitting the address information to the messaging system over a line;

detecting whether loop current is present or absent from the line;

if loop current is present, connecting the calling party with the messaging system; and if loop current is absent, transmitting an identifying tone to the calling party, wherein the identifying tone is busy tone.

* * * * *